United States Patent [19]

Stedman

[11] 4,230,199
[45] Oct. 28, 1980

[54] APPARATUS FOR SHIFTING CENTER OF GRAVITY OF A WORK VEHICLE

[75] Inventor: Robert N. Stedman, Chillicothe, Ill.

[73] Assignee: Caterpillar Tractor Co., Peoria, Ill.

[21] Appl. No.: 973,043

[22] Filed: Dec. 12, 1978

[51] Int. Cl.³ .................................... B62D 55/06
[52] U.S. Cl. .......................... 180/9.2 R; 172/669; 180/9.5
[58] Field of Search .......... 180/9.5, 9.52, 9.2 R, 180/9.32, 9.48; 172/669, 675; 212/49; 414/719; 298/17 SG

[56] References Cited

U.S. PATENT DOCUMENTS

| 2,113,997 | 4/1938 | Starr | 37/144 |
|---|---|---|---|
| 2,821,795 | 2/1958 | Williams | 37/144 |
| 3,185,316 | 5/1965 | Bennett | 212/49 |
| 3,204,714 | 9/1965 | Gray | 180/9.32 X |
| 3,567,049 | 3/1971 | Guinot | 414/719X |
| 4,018,295 | 4/1977 | Hasselbacher | 305/31 X |
| 4,071,277 | 1/1978 | Stedman | 180/89.1 X |

FOREIGN PATENT DOCUMENTS

| 2532382 | 1/1976 | Fed. Rep. of Germany | 414/719 |
|---|---|---|---|
| 1213268 | 10/1959 | France | 180/9.52 |
| 1330879 | 8/1963 | France | 414/719 |
| 636228 | 4/1950 | United Kingdom | 180/9.52 |

Primary Examiner—John A. Pekar
Attorney, Agent, or Firm—William B. Heming

[57] ABSTRACT

A work vehicle (10) such as, for example, a tractor (74) or loader (27) has a center of gravity (12), a body (14) and first and second continuous track assemblies (18,20). In the use of the tractor (74), for example, forwardly locating the center of gravity (12) can increase penetration of a bulldozer (76) on the tractor (74) during bulldozing operations. During ripping operations, penetration of a ripper (78) on the tractor (74) can be increased by rearwardly locating the center of gravity (12). Apparatus (22) is provided for controllably moving the body (14) relative to both of the track assemblies (18,20). Said apparatus (22) thus controllably shifts the center of gravity (12) of the tractor (74) relative to both of said track assemblies (18,20) for selectively increasing penetration of the ripper (78) or bulldozer (76) depending upon the operation being performed by said tractor (74).

19 Claims, 9 Drawing Figures

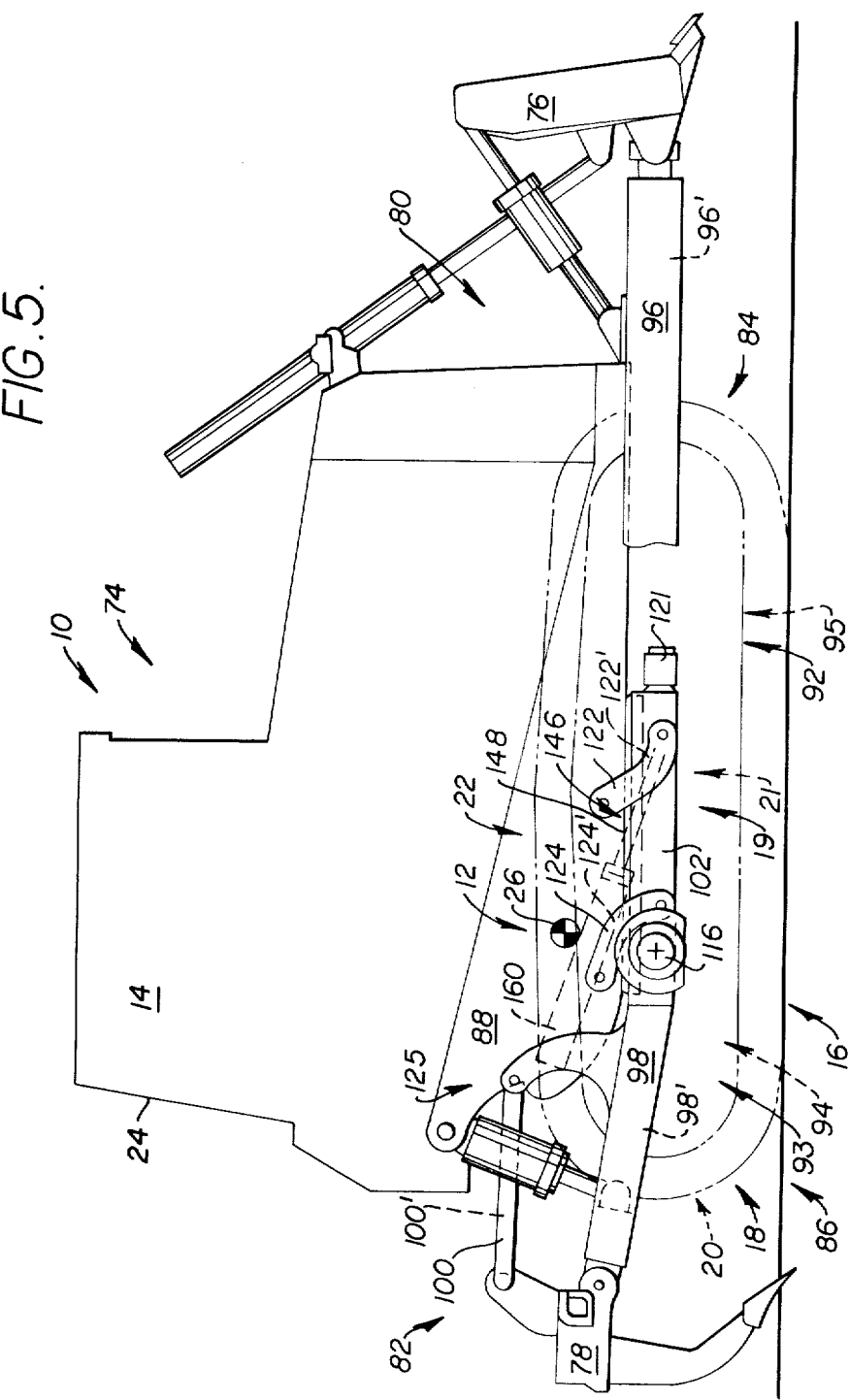

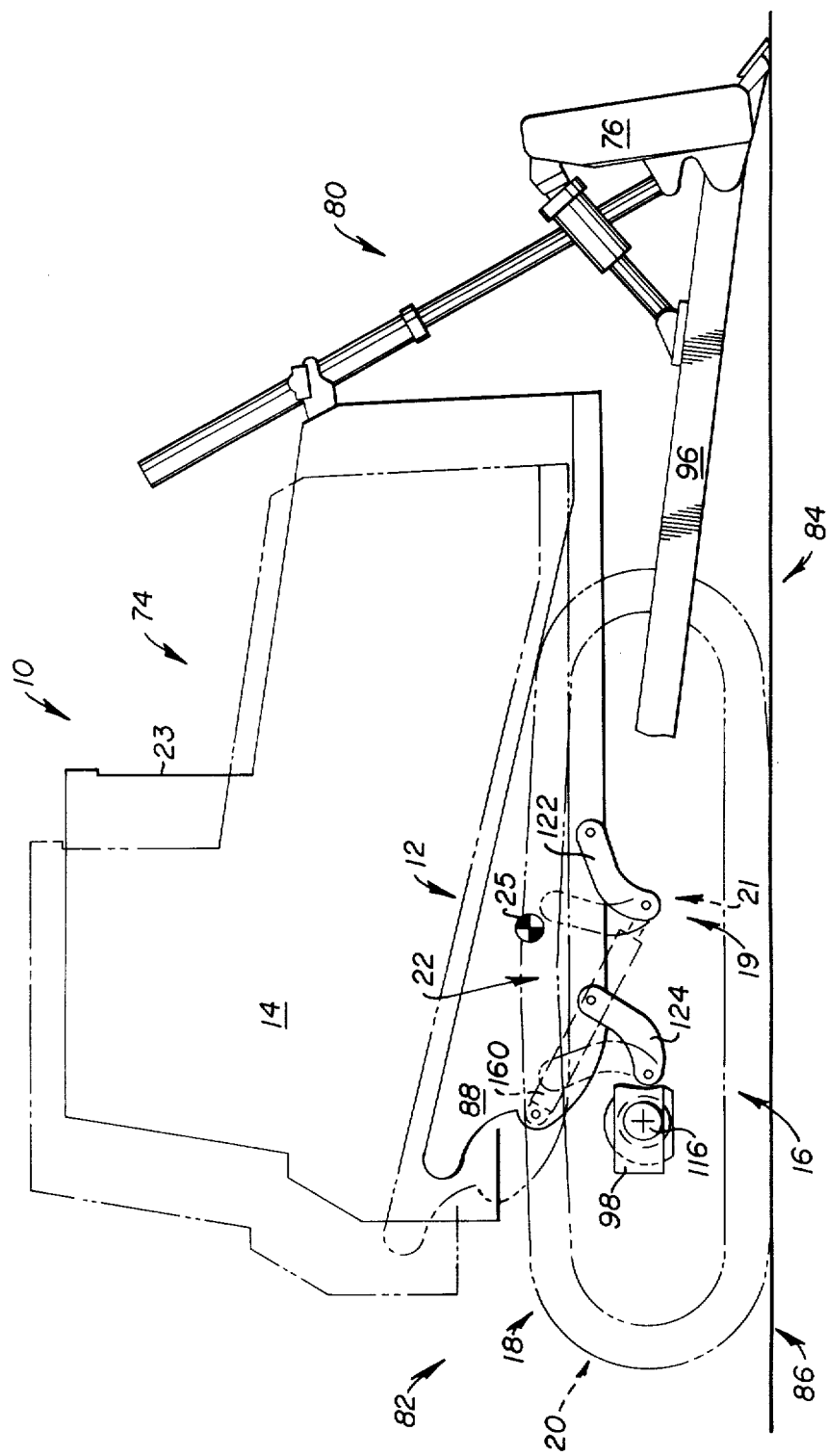

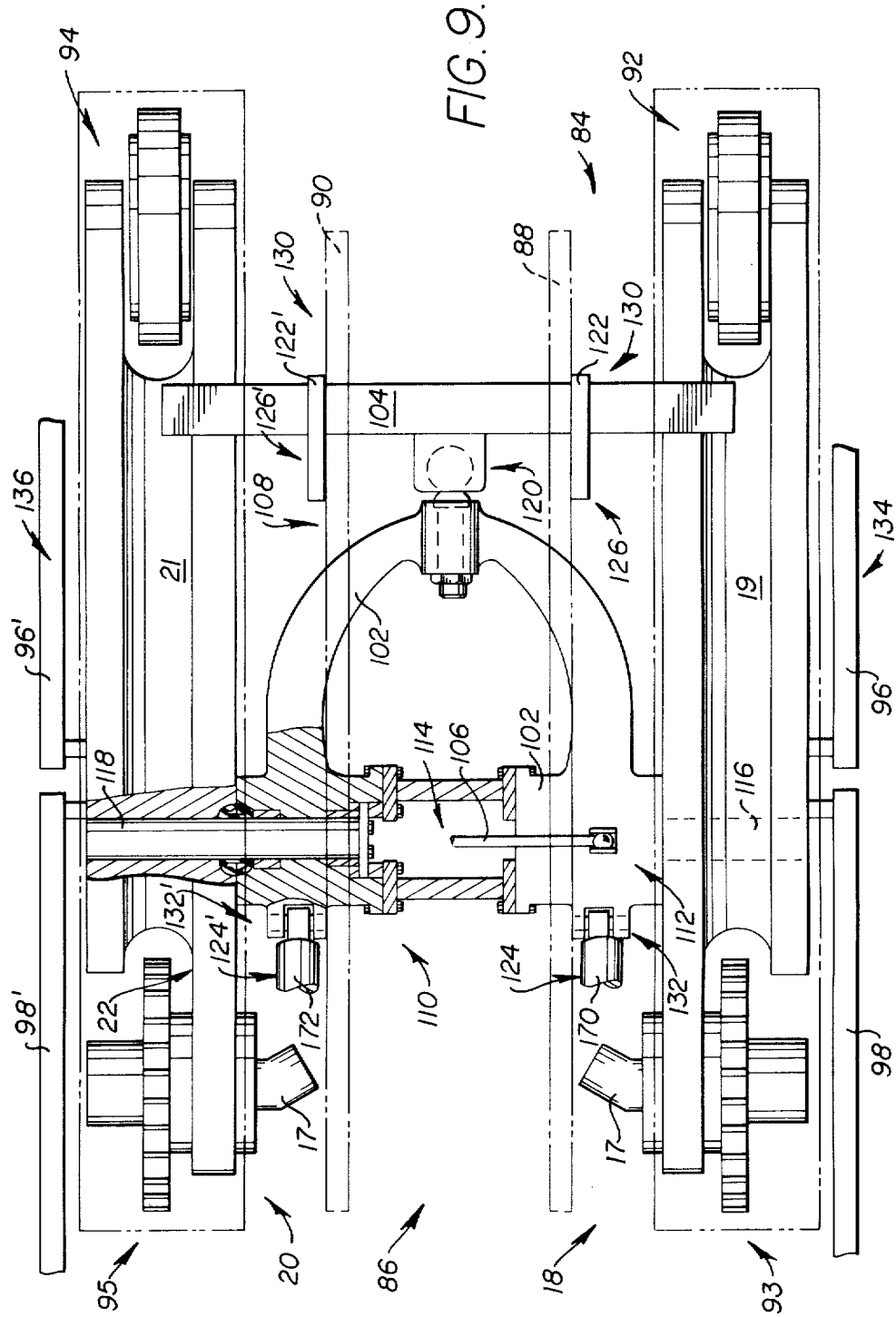

APPARATUS FOR SHIFTING CENTER OF GRAVITY OF A WORK VEHICLE

DESCRIPTION

1. Technical Field

The invention relates to controllably shifting the center of gravity of a work vehicle, such as a tractor or loader, to accommodate varying uses of said work vehicle. More particularly, the invention relates to means for controllably moving a body of the work vehicle relative to both continuous track assemblies of said vehicle for controllably shifting the center of gravity relative to both of said track assemblies.

2. Background Art

In the use of a work vehicle, it is desirable to controllably shift the center of gravity of the vehicle to suitably adapt the vehicle to a particular operation being performed by the vehicle, such as in bulldozing or ripping. Shifting of the center of gravity can be used to substantially overcome problems of balance of the vehicle or efficiency of the implement being used on said vehicle.

U.S. Pat. No. 2,113,997 which issued to Starr on Apr. 12, 1938, discloses one continuous track assembly of a work vehicle being movable relative to the body and the other continuous track assembly of the vehicle in order to space said track assemblies closely adjacent a tilted blade implement for better support of the blade during vehicle operations involving said blade.

U.S. Pat. No. 2,821,795 which issued to Williams on Feb. 4, 1958, discloses one-half of the vehicle; i.e., a part of the body and one continuous track assembly, being moveable relative to the other half of the vehicle for changing the tilt angle of the vehicle mounted blade.

U.S. Pat. No. 4,071,277 which issued to Stedman on Jan. 31, 1978, discloses a truck having a subframe locating rear drive axles of the truck relative to a main frame of the truck.

For example, track type tractors are commonly equipped with both a bulldozer and a ripper for flexible use of the tractor in the field. In the use of the bulldozer, penetration of the bulldozer and balance of the tractor is generally accomplished by forwardly locating the center of gravity on the tractor. However, ripper penetration and balance of the tractor during penetrating ripper operations, such as in rock, is better accomplished by rearwardly locating the center of gravity on the tractor.

Heretofore, the center of gravity of track type tractors used for both bulldozing and ripping operations has been generally centrally located. This results in a waste of time and labor owing to the less than desirable balance of the tractor and penetration of a particular implement during certain operations.

A similar compromise in location of the center of gravity exists with track type loaders. A forwardly located center of gravity increases bucket lifting force during loading. However, the result is to reduce the reach of the bucket from the loader owing to the relative position of said bucket more closely to the loader and, in particular, the track assemblies. The reduction in bucket reach interferes with proper positioning of the loader relative to a truck, for example, for dumping the bucket into said truck. The center of gravity of loaders has thus been generally centrally located for better flexibility in both loading and unloading operations.

Therefore, it is desirable to provide means for shifting the center of gravity of a track type vehicle in order to more suitably adapt said vehicle to particular operations being performed.

DISCLOSURE OF INVENTION

In one aspect of the present invention, a work vehicle has a center of gravity, a body and a lower portion having first and second track assemblies. Means is provided for controllably moving the body relative to both of the track assemblies for selectively, controllably shifting the center of gravity relative to both of said track assemblies.

The work vehicle is, for example, a tractor having a blade and a ripper for performing both bulldozing and ripping operations. Penetration of the blade can be increased by forwardly locating the center of gravity on the tractor. However, penetration of the ripper is generally increased by rearwardly locating the center of gravity. The center of gravity of work vehicles has heretofore been generally centrally located to accommodate multiple uses of the work vehicle. In one aspect of the present invention, the center of gravity is controllably shifted to suitably adapt the vehicle to the particular operation being performed.

BRIEF DESCRIPTION OF DRAWINGS

FIG. 5 is a diagrammatic view showing another embodiment of the invention on a track type tractor;

FIG. 6 is a diagrammatic view showing a different position of the embodiment of the invention of FIG. 5;

FIG. 9 is a diagrammatic plan view showing the embodiment of the invention of FIG. 8.

BEST MODE FOR CARRYING OUT THE INVENTION

Figures 1, 4:
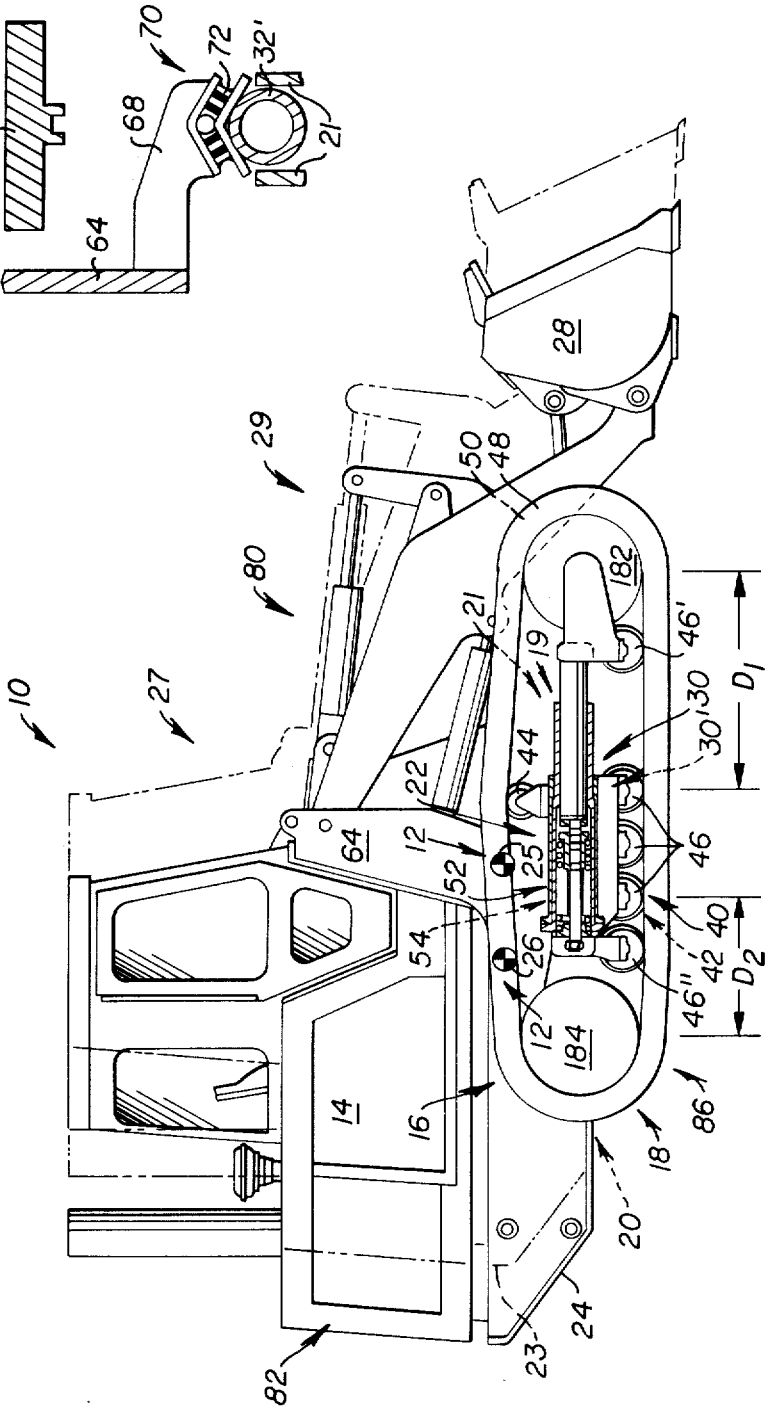
FIG. 1 is a diagrammatic view showing one embodiment of the invention on a track type loader.
FIG. 4 is a diagrammatic cross-sectional partial view taken through the track roller frame and showing a different embodiment of the invention of FIG. 3.

Referring to the drawings, a work vehicle 10 has a center of gravity 12, a body 14 and a lower portion 16. The lower portion 16 has first and second track assemblies 18,20 and each of said track assemblies 18,20 has a track frame 19,21. Means 22 is provided for controllably moving the body 14 relative to both of the track assemblies 18,20 for controllably shifting the center of gravity 12 relative to both of the track assemblies 18,20. The body 14 is controllably moved between first and second positions 23,24 by said moving means 22. The second position 24 is rearwardly located relative to the first position 23. At the first position 23 of the body 14, the center of gravity 12 is at a first preselected position 25 relative to both of the track assemblies 18,20. At the second position 24, the center of gravity 12 is at a second preselected position 26 relative to both of said track assemblies 18,20. Said preselected positions 25,26 are dependent upon the type and use of the work vehicle 10, as will hereinafter be more fully discussed.

Figure 8:
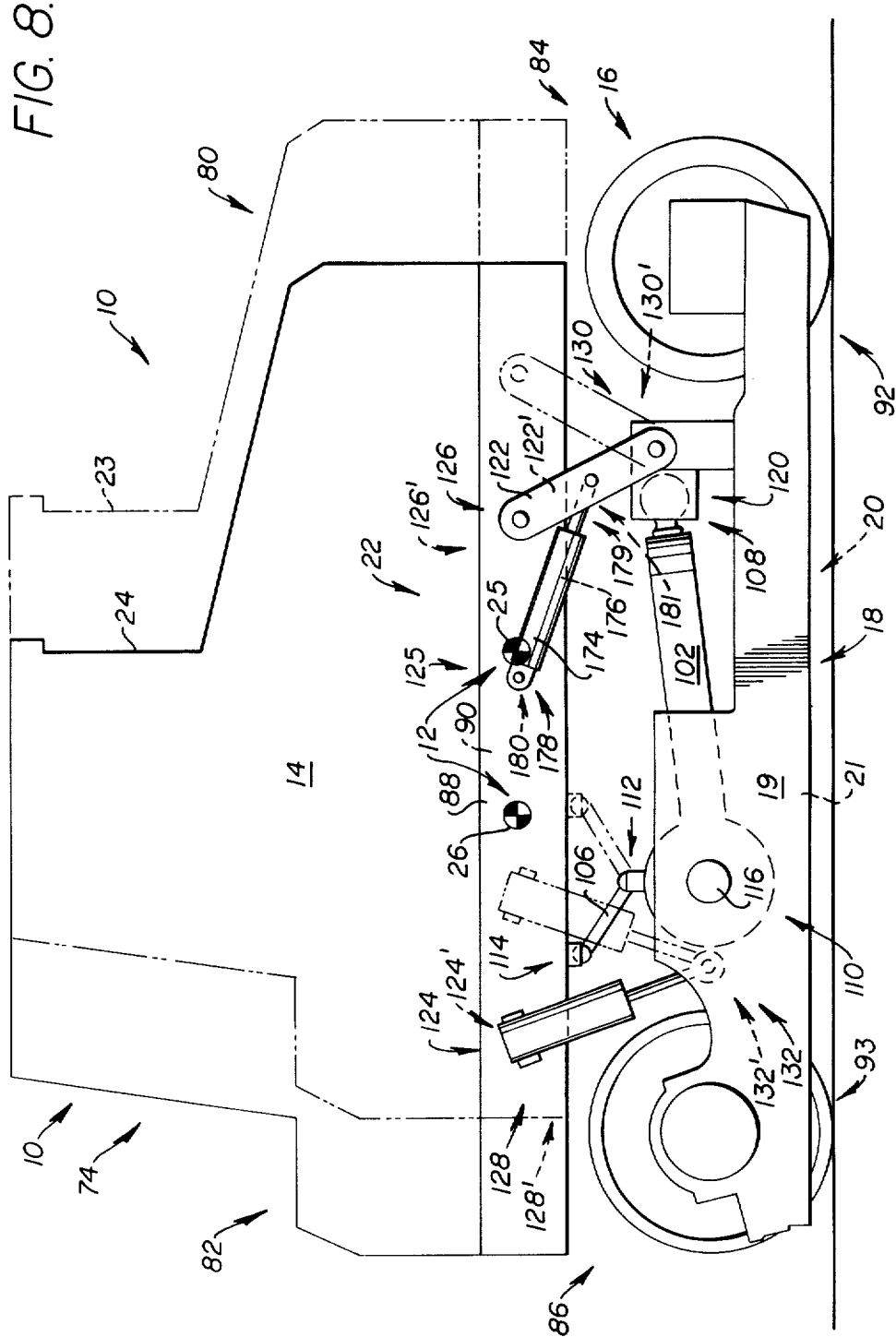
FIG. 8 is a diagrammatic view showing yet another embodiment of the invention on a track type tractor.

In the embodiment of FIG. 1, the moving means 22 controllably, slidably moves the body 14 relative to both of the track assemblies 18,20. In the embodiment of FIGS. 5 and 8, said moving means 22 controllably, pivotally moves the body 14 relative to both of the track assemblies 18,20. Each of said embodiments is hereinafter more fully discussed.

In the work vehicle 10 associated with the present invention, as is shown in FIG. 9, for example, each of the track assemblies 18,20 of the vehicle 10 is driven by a hydraulic motor 17 connected to a pressurized fluid supply source (not shown) on the respective vehicle 10. The use of flexible couplings and hose to connect the motors 17 and the fluid supply source permits movement of the body 14 relative to both of the track assemblies 18,20.

Figure 3:
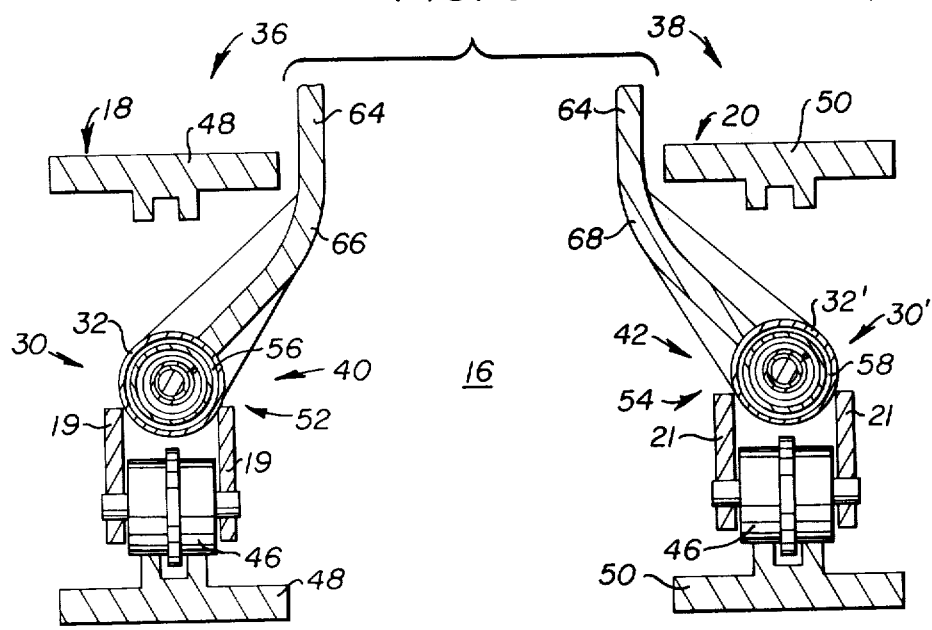
FIG. 3 is a diagrammatic cross-sectional view taken through the track roller frame along line III—III of FIG. 2.

Referring to the preferred embodiment of FIG. 1, the work vehicle 10 is shown as a track type loader 27 having a bucket implement 28 movably connected to a front end portion 29 of said loader 27, as is well known in the art. The moving means 22 includes a plurality of hydraulic cylinders 30,30' such as shown, for example, by first and second hydraulic cylinders 30,30' in the embodiment of FIG. 1. It should be understood that any number of hydraulic cylinders greater than two can be used. Each of said hydraulic cylinders 30,30', as is best seen in FIG. 3, has a housing element 32,32' and a piston element 34,34' controllably slidable in said housing element 32,32'. The housing elements 32,32' are connected to one of the body 14 and lower portion 16. The piston elements 34,34' are connected to the other of the body 14 and lower portion 16. The body 14 is slidably moveable relative to both of the track assemblies 18,20 for shifting the center of gravity 12 in response to said piston elements 34,34' sliding relative to said housing elements 32,32'.

As is shown, it is desirable that the respective housing elements 32,32' of said cylinders 30,30' each be connected to the body 14 at first and second sides 36,38, respectively, of said body 14. The respective piston elements 34,34' of said first and second cylinders 30,30' are each connected to a respective one of middle portions 40,42 of the track frames 19,21, as is best seen in FIG. 3.

As will be evident to those skilled in the art, the track frames 19,21 are represented by the track roller frames of the respective continuous track assemblies 18,20. A carrier roller 44 and a plurality of track rollers 46 are connected to each track roller frame 19,21 to support a respective track 48,50 of the first and second continuous track assemblies 18,20 during operation of the loader 27. The track assemblies 18,20 each have recoil and track adjusting mechanisms 52,54, as is well known in the tractor art for providing tension adjustment of the respective tracks 48,50 and recoil of the track roller frames 19,21. Recoil of said frames 19,21 is in response to forces exerted on the tracks 48,50 by objects such as rocks or the like during operation of the loader 27.

Figure 2:
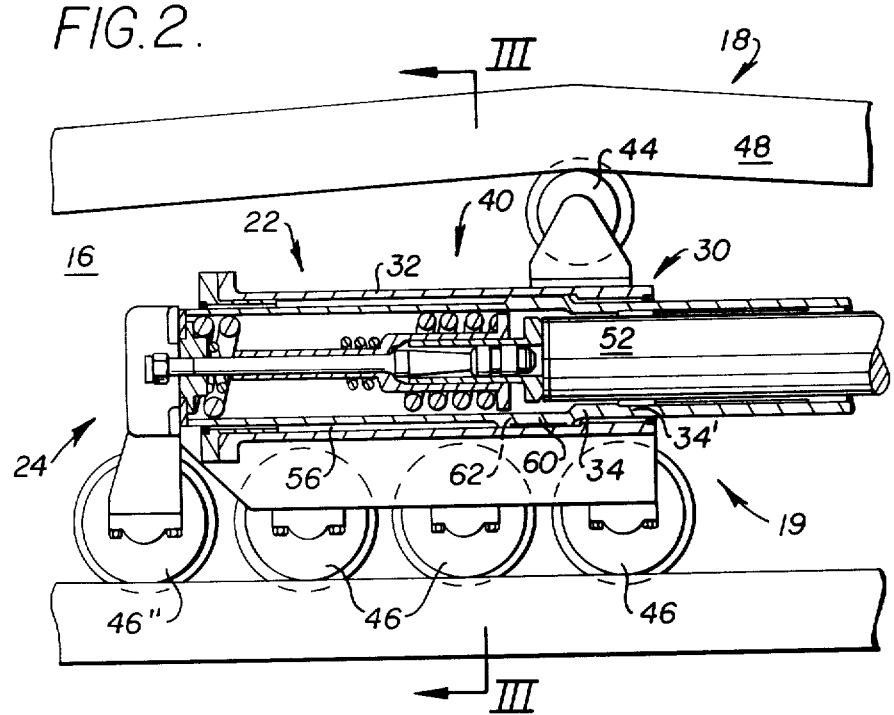
FIG. 2 is a diagrammatic partial view of FIG. 1.

The piston elements 34,34' of the first and second hydraulic cylinders 30,30' are preferably each of an annular configuration. Each of said piston elements 34,34' is positioned about the recoil and track adjusting mechanism 52,54 of the respective one of the track assemblies 18,20, as is best seen in FIGS. 2 and 3. The housing elements 32,32' are also each of an annular configuration and are each positioned about the respective one of the piston elements 34,34'. In the above mentioned manner, related housing and piston elements 32,32',34,34' form respective chambers 56,58. A respective piston 60,62 of each of said piston elements 34,34' is controllably slidable (FIGS. 2 and 3) in said related chambers 58,60. Said pistons 60,62 are controllably moveable or slidable in response to fluid being controllably passed into forward or rear portions of the respective chambers 56,58 for exerting forces on said pistons 60,62, as is well known in the hydraulic art. In this manner, the body 14 is controllably slidable between the first and second positions 23,24 for shifting the center of gravity 12 between the first and second preselected positions 25,26.

Referring to FIG. 3, a frame 64 of the body 14 has first and second flange portions 66,68 extending downwardly on the first and second sides 36,38 of the loader body 14, respectively. The housing elements 32,32' are each connected to a respective one of said flange portions 66,68 for connecting the related hydraulic cylinders 30,30' to the body 14 of the loader 24. Said housing elements 32,32' and flange portions 66,68 are connected by welds, bolts or the like. However, as is shown in FIG. 4, resilient means 70, such as an elastomeric spring 72, can be positioned between the respective flange portions 66,68 and housing elements 32,32' in order to provide a suspension for the loader 25. The flange portion 68 shown is of a different configuration than the related flange portion 68 in FIG. 3 in order to position the elastomeric spring 72 substantially vertical relative to the body 14 and lower portion 16 of the loader 27 for better absorption of the forces encountered in operating the loader 27.

Figure 7:
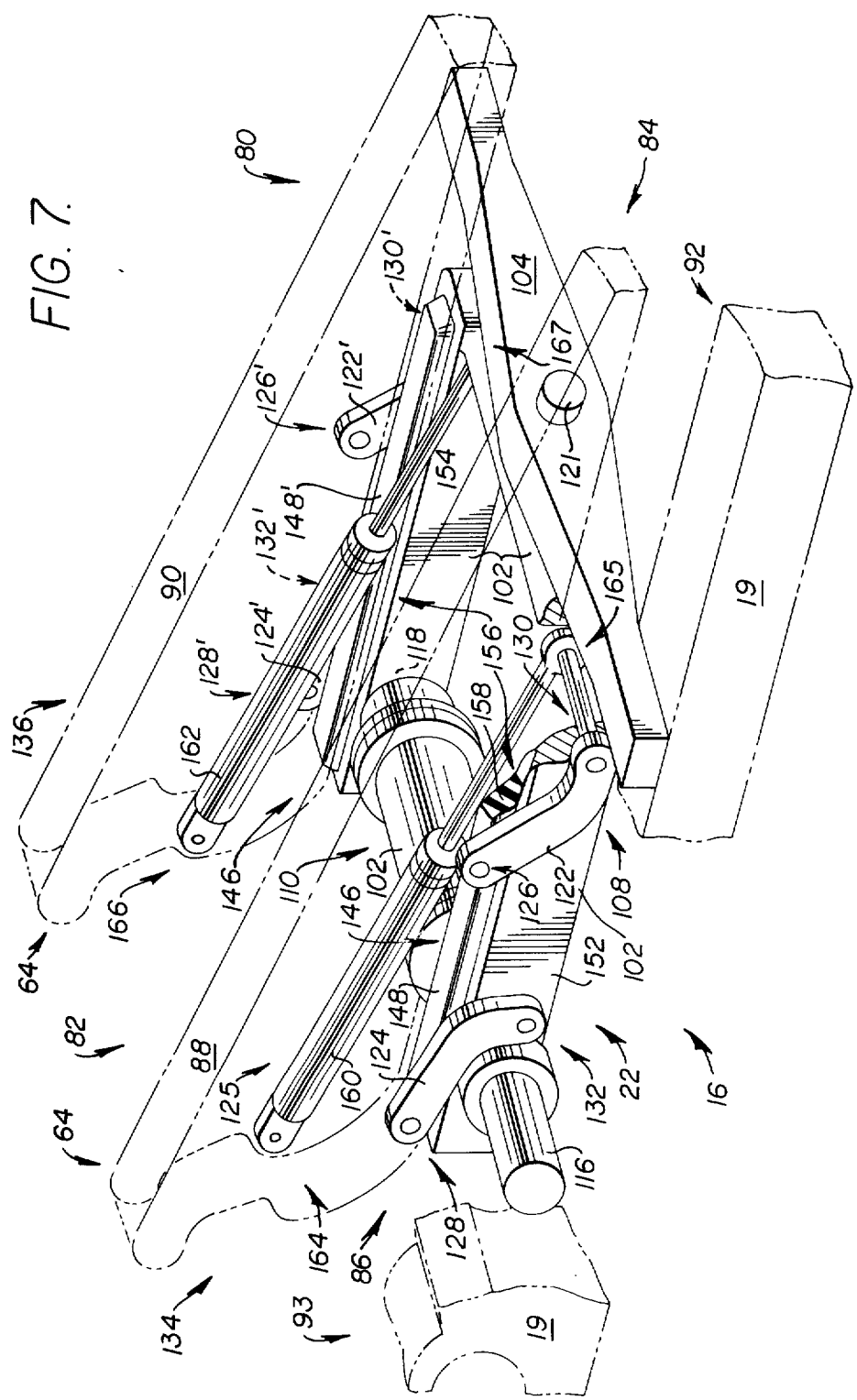
FIG. 7 is a diagrammatic perspective cutaway view showing the embodiment of the invention of FIG. 5.

Referring to the embodiments of FIGS. 5 and 8, the work vehicle 10 is a track type tractor 74 having bulldozer 76 and ripper 78 implements as is well known in the tractor art (shown only in FIGS. 5 and 6). The body 14 and lower portion 16 of said tractor 74 each have first and second end portions 80,82;84,86. Said body 14 has the frame 64 and said frame 64 has first and second rails 88,90 (FIGS. 7 and 9). The track assemblies 18,20 also each have the respective one of the tracks 48,50 and track roller frames 19,21. Said track roller frames 19,21 each have first and second end portions 92,93;94,95 and are connected to the track rollers and carrier rollers (not shown in the embodiments). The bulldozer 76 and ripper 78 are each pivotally connected to the track roller frames 19,21 by respective first and second arms 96,96';98,98'. The ripper 78 is also pivotally connected to the arms 98,98' by first and second rods 100,100', which can also be hydraulic cylinders. Said implements 76,78 are similarly connected to the tractor 74 in the embodiment of FIG. 8.

The lower portion 16 of the tractor 74 has a subframe 102, a crossbar 104 and a tag link 106. The crossbar 104, shown as an equalizer bar 104, is connected by a ball and socket joint 120 to the subframe 102 in FIG. 9 and by a trunnion mounting 121 in FIG. 7 to accommodate movement of the subframe 102 relative to the track assemblies 18,20.

The subframe 102 has first and second end portions 108,110 and is movably connected to both of the track roller frames 19,21. Said subframe 102 is of a construction sufficient for positioning both of the track assemblies 18,20 one relative to the other. The crossbar 104 is movably connected to the first end portion 108 of the subframe 102 and is in contact with the first end portions 92,94 of the track roller frames 19,21. Referring to FIG. 9, the second end portions 93,95 of the track roller frames 19,21 each have a journal shaft 116,118 connected to the second end portion 110 of the subframe 102. The journal shafts 116,118 are of a construction sufficient for supporting said subframe 102 in rotation relative to the related one of the track assemblies 18,20. The subframe 102 can also have the journal shafts 116,118 (FIG. 7).

The tag link 106, shown only in FIGS. 8 and 9, has first and second end portions 112,114 and is of a construction sufficient for substantially blocking lateral movement of the second end portion 82. The first end portion 112 of said tag link 106 is connected to the second end portion 82 of the body 14. The second end portion 114 is connected to the subframe 102. The end portions 112,114 of said tag link 106 are movably connected to the related elements, as shown, in order to permit relative longitudinal movement of said elements. Movement of said tag link 106 in relationship to movement of the body 14 relative to the lower portion 16 is shown in outline by way of example in FIG. 8. Such crossbar and tag link construction is well known in the tractor art and is commonly used on track type vehicles. It should be understood that the subframe 102, crossbar 104 and tag link 106 can be of other configurations, as is known in the art without departing from the invention.

The moving means 22 includes a plurality of links 122,122',124,124' and power means 125 for pivotally moving the body 14 relative to both of the track assemblies 18,20. In the embodiments of FIGS. 5 and 8, said moving means 22 has first, second, third and fourth links 122,122';124,124'. However, it should be understood that any number of links greater than two can be used. The body 14 is thus pivotally moveable between the first and second positions 23,24 in response to actuating the power means 125. The preselected locations 25,26 of the center of gravity 12 are, in the embodiments of FIGS. 5 and 8, dependent principally upon use of the bulldozer 76 or ripper 78. Each of the links 122,122', 124,124' has a first end portion 126,126', 128,128' pivotally connected to the body 14 and a second end portion 130,130',132,132' pivotally connected to the lower portion 16. Each of the separate embodiments is hereinafter more fully described.

Referring only to the embodiment of FIG. 5, the first and second links 122,122' are positioned on opposite sides 134,136 of the tractor 74. The first end portions 126,126' of said links 122,122' are each pivotally connected to the first end portion 80 of the body 14. The second end portions 130,130' are each pivotally connected to the first end portion 84 of the lower portion 16. The third and fourth links 124,124' are also positioned on the opposite sides 134,136 of the tractor 74. The first end portions 128,128' of said third and fourth links 124,124' are each pivotally connected to the second end portion 82 of the body 14. The second end portions 132,132' are each pivotally connected to the second end portion 86 of the lower portion 16. Said links 122,122',124,124' can also be reversed.

As is shown, the first end portions 126,126', 128,128' are each connected to a respective one of the rails 88,90 of the frame 64. The second end portions 130,130' of the first and second links 122,122' preferably are pivotally connected to the first end portion 108 of the subframe 102. The second end portions 132,132' preferably are pivotally connected to the second end portion 110 of the subframe 102.

The subframe 102 has a support area 146 contactable with the body 14 in response to pivotally moving said body 14. The body 14 is in contact with the support area 146 of the subframe 102 at the first and second positions 23,24. Said support area 146 has first and second portions 148,148' each located on a respective leg 152,154 of the subframe 102 and each contactable with a respective one of the rails 88,90 of the frame 64. It is desirable that the support area 146 have resilient means 156 for contacting the body 12 and supporting said body 12 relative to the subframe 102. The resilient means 156 is preferably an elastomeric element 158 such as rubber or the like for substantially isolating the body 14 from the working environment of the tractor 74.

The power means 125 includes first and second hydraulic cylinders 160,162 each having first and second ends 164,165;166,167. Said cylinders 160,162 each have their first end 164,165 pivotally connected to the body 14 and their second end 165,167 pivotally connected to a respective one of the links 122,122', 124,124'. Said first ends 164,166 are each shown connected to a respective one of the rails 88,90 of the frame 64 at the second end portion 82 of the body 14. The second ends 165,167 are each shown connected to the first and second links 122,122', respectively. Said cylinders 160,162 can also be reversed or positioned at other locations on the tractor 74. Actuation of the first and second cylinders 160,162 exerts forces on said first and second links 122,122' to pivotally move the body 14 relative to both of the track assemblies 18,20 for shifting the center of gravity 12. Only one hydraulic cylinder centrally located on the tractor 14 can also be used. The rigidity of the body 14 relative to the lower portion 16 can thus be increased by additional links each positioned opposite one of the first, second, third and fourth links 122,122';124,124' on opposite sides of the legs 152,154 of the subframe 102.

Referring to the embodiment of FIG. 8, the first and second links 122,122' are positioned on opposite sides 134,136 of the tractor 74. The first and second links 122,122' each have their first end portion 126,126' pivotally connected to the first end portion 80 of the body 14. The second end portions 130,130' of the links 122,122' are pivotally connected to the equalizer bar 104. The third and fourth links 124,124' each have their first end portions 128,128' pivotally connected to the second end portion 82 of the body 14. Said first end portions 126,126',128,128' of the links 122,122',124,124' are each connected to respective rails 88,90 of the frame 64. The third and fourth links 124,124' preferably each have their second end portion 132,132' pivotally connected to the second end portion 110 of the subframe 102.

It is desirable that the third and fourth links 124,124' each be of a construction sufficient for controllably maintaining the body 14 relative to the lower portion 16 against forces exerted on the tractor 74. Said third and fourth links 124,124' preferably are each a fluid cylinder 170,172 which acts as a shock absorbing element to substantially controllably isolate the second end portion 82 of the body 14 from the track assemblies 18,20.

The power means 125 in the embodiment of FIG. 6 includes first and second hydraulic cylinders 174,176 (shown only in FIG. 8). Each of said cylinders 174,176 has a first end 178,180 pivotally connected to a respective one of the rails 88,90 of frame 64 and a second end 179,181 pivotally connected to the first and second links 122,122', respectively. Said cylinders 174,176 can also be reversed. Actuation of the first and second hydraulic cylinders 174,176 exerts forces on the first and second links 122,122' to pivotally move the body 14 relative to both of the track assemblies 18,20 for shifting the center of gravity 12.

It should be understood that the work vehicles 10 and moving means 22 can be of other configurations as is known in the art without departing from the invention.

INDUSTRIAL APPLICABILITY

In the use of the moving means 22 for shifting the center of gravity 12, the body 14 of the work vehicle 10 is controllably moved relative to both of the track assemblies 18,20. In the embodiment of FIG. 1, actuation of the first and second hydraulic cylinders 30,30' slidably moves the body 12 between the first and second positions 23,24. In the embodiment of FIGS. 5 and 8, actuation of the respective hydraulic cylinders 160,162;174,176 exerts forces on the related links 122,122' to pivotally move the body 14. The center of gravity 12 is thus controllably shifted to provide better balance of the work vehicle 10 during specific operations of said work vehicle 10.

Referring to the preferred embodiment of FIG. 1, fluid is controllably passed to the first and second hydraulic cylinders 30,30' to controllably move the housing elements 32,32' relative to the piston elements 34,34'. The body 14 of the loader 27 thus moves relative to both track assemblies 18,20 to an infinite number of positions between the first and second positions 23,24 of said body 14. The result is an infinite number of positions being available to the center of gravity 12 of the loader 27 between the first and second preselected positions 25,26 of said center of gravity 12.

For the loader 27, the first and second preselected positions 25,26 of the center of gravity 12, as limited by the travel of the pistons 60,62 in the housing elements 32,32', are primarily dependent upon the desired positioning of the body 14 relative to the track assemblies 18,20 during loading and unloading operations. In loading the bucket 28, the center of gravity 12 is rearwardly located on the loader 27 to increase traction and bucket lifting force. The most rearwardly available location is the second position 26 of the center of gravity 12 at which the body 14 is located at the second position 24.

In unloading the bucket, particularly into a vehicle such as a truck, sufficient clearance between the track assemblies 18,20 and said vehicle is established by moving the body 14 toward the first position 23. The result is, in effect, to move the bucket 28 further forward relative to the track assemblies 18,20, permitting proper positioning of the bucket 28 over the truck. The center of gravity 12 accordingly shifts to the first preselected position 25 which provides better balance of the loader 27 during travel and unloading cycles.

As will be evident from a study of FIG. 1, the track rollers 46, which are necessarily connected to the housing elements 32,32' of the hydraulic cylinders 30,30', are spaced varying distances $D_1,D_2$ from an idler 182 and sprocket 184, respectively, depending upon the position 23,24 of the body 14 relative to the track assemblies 18,20. The distances $D_1,D_2$ vary owing to movement of said housing elements 32,32' relative to the track assemblies 18,20 in response to shifting the center of gravity 12. As a result, track roller contact with certain portions of the track 186 is reduced. Therefore, two of the track rollers 46',46" on each side 36,38 of the loader 27 are connected adjacent the idler 182 and sprocket 184, respectively, and fixed relative to the track roller frames 19,21. This tends to reduce the distances $D_1,D_2$ and increase contact between the track 48,50 and the rollers 46.

Referring to the embodiments of FIGS. 5 and 8, the body 14 is controllably pivotally moved relative to both of the track assemblies 18,20 and between the first and second positions 23,24 in response to actuation of the respective related hydraulic cylinders 160,162; 174,176. The first and second preselected positions 25,26 of the center of gravity 12 are related to said body positions 23,24, respectively. The physical limits of the positions 25,26 of the center of gravity 12 are dependent upon the positioning of the cylinders 160,162, 174,176 relative to the links 122, 122', as well as cylinder travel and link configuration.

An infinite number of positions are available for the center of gravity 12 between the first and second preselected positions 25,26. In the embodiment of FIG. 5, said preselected positions 25,26 are the most desirable owing to the use of the support area 146 and resilient means 156 to locate the body 14 relative to the lower portion 16. FIG. 5 shows the second position 24 of the body 14. FIG. 6 shows the first position 23 of the body 14 and an intermediate position (in outline). In the embodiment of FIG. 8, the hydraulic cylinders 174,176 attached to the first and second links 122,122' locate and tend to suspend or cushion the body 14 in the first position 23 (shown in outline) and the second position 24. It may also be desirable to add stops (not shown) to more positively establish the most desirable positions of the body 14 in the embodiment of FIG. 8.

The most desirable locations for the first and second preselected positions 25,26 of the center of gravity 12 are dependent upon the operations being performed by the tractor 74. For example, the center of gravity 12 is desirably located forwardly during use of the bulldozer 76. The desired forward location, corresponding to the first preselected location 25, provides better balance of the tractor 74 and better penetration of the bulldozer 76 (FIG. 6). In using the ripper 78 for operations involving penetration into rock or hard ground, for example, the center of gravity 12 is desirably positioned rearwardly for similar reasons. The desired rearward location corresponds to the second preselected position 26. Such desired locations 25,26 therefore determine the physical locations of the hydraulic cylinders 160,162;174,176 and the links 122,122',124,124' on the tractor 74.

The subframe 102 of the tractor 74 maintains the track assemblies 18,20 in proper relationship one from the other and relative to the body 14 in conjunction with the crossbar equalizer bar 104 and tag link 106. Said subframe 102 is necessary owing to the use of the separate hydraulic motors 17 for driving each of the track assemblies 18,20. Limited oscillation of the body 12 relative to the track assemblies 18,20 is also provided by the subframe 102 owing to the use of the journal shafts 116,118 in relationship with the crossbar 106.

It should be noted that the present invention in the embodiment of FIG. 1 is particularly suited to use on track type vehicles of a high-drive or elevated sprocket drive configuration. The embodiment of FIG. 1 permits use of such high-drive vehicles having conventional final drive and transmission drive trains. In such cases, the lower portion of the vehicle consists primarily of the front and rear idlers and the track roller frames. The body, including the final drive and drive sprocket, moves relative to the lower portion and the track travels across the sprocket for repositioning of the drive location of the sprocket on the track at the various locations of the center of gravity.

It should be understood that the separate embodiments are not limited to the type of work vehicle explained in cojunction with a particular embodiment.

Other aspects, objects and advantages will become apparent from a study of the specification, drawings and appended claims.

I claim:

1. In a work vehicle (10) having a center of gravity (12), a body (14) and a lower portion (16) having first and second continuous track assemblies (18,20), said first and second track assemblies (18,20) each having a track frame (19,21) having first and second end portions (92,93;94,95), the improvement comprising:
    said lower portion (16) having a subframe (102), said subframe (102) having first and second end portions (108,110) and being movably connected to said track frames (19,21) at locations sufficient for positioning said track assemblies (18,20) one relative to the other;
    a plurality of links (122,122′,124,124′) each having first and second end portions (126,130;126′,130′;128,132′,128′,132′), each of said first end portions (126,126′,128,128′) being pivotally connected to said body (14), each of said second end portions (130,130′,132,132′) being pivotally connected to said lower portion (16); and
    power means (125) for pivotally moving said body (14) relative to both of the track assemblies (18,20) for selectively, controllably shifting the center of gravity (12).

2. A work vehicle (10), as set forth in claim 1, wherein the lower portion (16) has a cross bar (104) movably connected to the first end portion (108) of the subframe (102) and being in contact with the first end portions (92,94) of the track frames (19,21).

3. A work vehicle (10), as set forth in claim 2, wherein the plurality of links includes first, second, third and fourth links (122,122′,124,124′), said first and second links (122,122′) being positioned on opposite sides (134,136) of the work vehicle (10), each of the first end portions (126,126′) of said first and second links (122,122′) being pivotally connected to the first end portion (80) of the body (14), each of the second end portions (130,130′) of said first and second links (122,122′) being pivotally connected to the crossbar (104), said third and fourth links (124,124′) being positioned on the opposite sides (134,136) of the work vehicle (10), each of the first end portions (128,128′) of said third and fourth links (124,124′) being pivotally connected to the second end portion (82) of the body (14), each of the second end portions (132,132′) of said third and fourth links (124,124′) being pivotally connected to the second end portion (86) of the lower portion (16).

4. A work vehicle (10), as set forth in claim 3, wherein the second end portions (132,132′) of the third and fourth links (124,124′) are pivotally connected to the second end portion (110) of the subframe (102).

5. A work vehicle (10), as set forth in claim 3, wherein said third and fourth links (124,124′) are each of a construction sufficient for controllably maintaining the body (14) relative to the lower portion (16) against forces exerted on the work vehicle (10).

6. A work vehicle (10), as set forth in claim 5, wherein said third and fourth links (124,124′) are each a fluid cylinder (170,172).

7. A work vehicle (10), as set forth in claim 3, wherein the power means (125) includes first and second hydraulic cylinders (174,176) each having first and second ends (178,179,180,181), each first end (178,180) being pivotally connected to the body (14) and each second end (179,181) being pivotally connected to a respective one of the first and second links (122,122′).

8. A work vehicle (10), as set forth in claim 1, wherein said second end portions (93,95) of the track frames (19,21) each have a journal shaft (116,118), said journal shafts (116,118) being connected to the second end portion (110) of the subframe (102) and each being of a construction sufficient for supporting said subframe (102) in rotation relative to a respective one of the track assemblies (18,20).

9. A work vehicle (10), as set forth in claim 1, wherein the body (14) has first and second end portions (80,82) and the lower portion (16) has a tag link (106) having first and second end portions (112,114) and being connected at the first end portion (112) to the second end portion (82) of the body (14) and at the second end portion (114) to the subframe (102).

10. A work vehicle (10), as set forth in claim 1, wherein the lower portion (16) has first and second end portions 84,86) and the plurality of links includes first, second, third and fourth links (122,122′,124,124′), said first and second links (122,122′) being positioned on opposite sides (134,136) of the work vehicle (10), each of the first end portions (126,126′) of said first and second links being pivotally connected to the first end portion (80) of the body (14), each of the second end portions (130,130′) of said first and second links (122,122′) being pivotally connected to the first end portion (84) of the lower portion (16), said third and fourth links (124,124′) being positioned on opposite sides (134,136) of the work vehicle (10), each of the first end portions (128,128′) of said third and fourth links (124,124′) being pivotally connected to the second end portion (82) of the body (14), each of the second end portions (132,132′) of said third and fourth links (124,124′) being pivotally connected to the second end portion (86) of the lower portion (16).

11. A work vehicle (10), as set forth in claim 10, wherein the second end portions (130,130′) of said first and second links (122,122′) are pivotally connected to the first end portion (108) of the subframe (102) and the second end portions (132,132′) of said third and fourth links (124,124′) are pivotally connected to the second end portion (110) of the subframe (102).

12. A work vehicle (10), as set forth in claim 10, wherein the power means (125) includes first and second hydraulic cylinders (160,162) each having first and second ends (164,165;166,167), each first end (164,166) being pivotally connected to the body (14) and each second end (165,167) being pivotally connected to a respective one of the links (122,122′).

13. A work vehicle (10), as set forth in claim 10, wherein the subframe (102) has a support area (146) contactable with the body (14) in response to pivotally moving said body (14).

14. A work vehicle (10), as set forth in claim 13, wherein the body (14) is pivotally movable between a first position (23) at which the center of gravity (12) is located at a first preselected position (25) relative to the track assemblies (18,20) and a second position (24) at which the center of gravity (12) is located at a second preselected position (26) relative to said track assemblies (18,20), said second position (24) being rearwardly located relative to said first position (23), said body (14) being in contact with the subframe (102) at said first and second positions (23,24).

15. A work vehicle (10), as set forth in claim 14, wherein the support area (146) has resilient means (156) for contacting said body (14) and supporting said body (14) relative to the subframe (102).

16. A work vehicle (10), as set forth in claim 15, wherein said resilient means (156) is an elastomeric element (158).

17. In a work vehicle (10) having a center of gravity (12), a body (14) having first and second end portions (80,82) and a lower portion (16) having first and second continuous track assemblies (18,20) each having a track frame (19,21), the improvement comprising:

said lower portion (16) having a subframe (102), said subframe (102) having first and second end portions (108,110) and being movably connected to the track frames (19,21) at locations sufficient for maintaining said track assemblies (18,20) in a preselected spaced-apart relationship one relative to the other;

first, second, third and fourth links (122,122',124,124') each having first and second end portions (126,130;126';130';128'132'128',132'), said first and second links (122,122') being positioned on opposite sides (134,136) of the work vehicle (10), each of the first end portions (126,126') of the first and second links (122,122') being pivotally connected to the first end portion (80) of the body (14), each of the second end portions (130,130') of the first and second links (122,122') being pivotally connected to the first end portion (108) of the subframe (102), said third and fourth links (124,124') being positioned on the opposite sides (134,136) of the work vehicle (10), each of the first end portions (128,128') of the third and fourth links (124,124') being pivotally connected to the second end portion (82) of the body (14), each of the second end portions (132,132') of the third and fourth links (124,124') being pivotally connected to the second end portion (110) of the subframe (102); and first and second hydraulic cylinders (160,162) each having first and second ends (164,165,166,167), each first end (164,166) being pivotally connected to the first end portion (80) of the body (14) and each second end (165,167) being pivotally connected to a respective one of the links (122,122'), said cylinders (160,162) being of a construction sufficient for controllably pivotally moving the body (14) relative to both of the track assemblies (18,20) for selectively, controllably shifting the center of gravity (12) relative to both of said track assemblies (18,20).

18. In a work vehicle having a center of gravity (12), a body (14) having first and second end portions (80,82) and a lower portion (16) having first and second continuous track assemblies (18,20), said track assemblies (18,20) each having a track frame (19,21) having first and second end portions (92,93,94,95), the improvement comprising:

said lower portion (16) having a subframe (102) and a crossbar (104), said subframe (102) having first and second end portions (108,110) and being moveably connected to the track frames (19,21) at locations sufficient for positioning said track assemblies (18,20) one relative to the other, said crossbar (104) being movably connected to the subframe (102) and in contact with the first end portions (92,94) of the track frames (19,21);

first, second, third and fourth links (122,122';124,124'), each having first and second end portions (126,130,126',130',128,132,128',132'), said first and second links (122,122') being positioned on opposite sides (134,136) of the work vehicle (10) and each having their first end portiion (126,126') pivotally connected to the first end portion (80) of the body (14) and their second end portion (130,130') pivotally connected to the crossbar (104), said third and fourth links (124,124') being positioned on opposite sides (134,136) of the work vehicle (10) and each having their first end portion (128,128') pivotally connected to the second end portion (82) of the body (14) and their second end portion (132,132') pivotally connected to the second end portion (11) of the subrame (102) and each being a double acting cylinder (170,172) of a construction sufficient for controllably maintaining the body (14) relative to the lower portion (16) against forces exerted on the work vehicle (10); and first and second hydraulic cylinders (174,176) each having first and second ends (178,179,180,181) and each having their first end (178,180) pivotally connected to the body (14) and their second end (179,181) pivotally connected to a respective one of the first and second links (122,122'), each of said hydraulic cylinders (174,176) being of a construction sufficient for controllably pivotally moving the body (14) relative to both of the track assemblies (18,20) for controllably shifting the center of gravity (12) relative to both of said track assemblies (18,20).

19. In a work vehicle (10) having a center of gravity (12), a body (14) and a lower portion (16) having first and second track assemblies (18,20), said track assemblies (18,20) each having a track frame (19,21) and recoil and track adjusting mechanisms (52,54), said track frames (19,21) each having a middle portion (40,42), the improvement comprising:

first and second hydraulic cylinders (30,31) each having a housing element (32,33) and a piston element (34,35) controllably slidable in said housing element (32,33) said housing elements (32,33) each being connected to the body (14), said piston elements (34,35) each being connected to a respective one of the middle portions (40,42) of said track frames (19,21) and each being of an annular configuration and positioned about the recoil and track adjusting mechanism (52,54) of a related track assembly (18,20); and said body (14) being controllably, slidably moveable relative to both of the track assemblies (18,20) in response to said piston elements (34,35) sliding relative to said housing elements (32,33).

* * * * *